US010845690B2

(12) United States Patent
Pan

(10) Patent No.: US 10,845,690 B2
(45) Date of Patent: Nov. 24, 2020

(54) ILLUMINATION SYSTEM AND PROJECTION APPARATUS

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 5 days.

(21) Appl. No.: 16/404,710

(22) Filed: May 6, 2019

(65) Prior Publication Data

US 2019/0346753 A1    Nov. 14, 2019

(30) Foreign Application Priority Data

May 10, 2018   (CN) .................... 2018 2 0690708 U
Nov. 26, 2018  (CN) .................... 2018 2 1951488 U

(51) Int. Cl.
  *G03B 21/14*   (2006.01)
  *G03B 21/20*   (2006.01)
  *H04N 9/31*    (2006.01)

(52) U.S. Cl.
  CPC ......... *G03B 21/204* (2013.01); *G03B 21/208* (2013.01); *H04N 9/3102* (2013.01)

(58) Field of Classification Search
  CPC .... G03B 21/21; G03B 21/204; G03B 21/208; H04N 9/31; H04N 9/312; H04N 9/3105; H04N 9/3108; H04N 9/3111
  See application file for complete search history.

(56) References Cited

U.S. PATENT DOCUMENTS

| | | | | |
|---|---|---|---|---|
| 9,977,317 | B2 * | 5/2018 | Wang | G02B 26/008 |
| 2018/0157028 | A1 * | 6/2018 | Liao | G02B 26/008 |
| 2019/0113763 | A1 * | 4/2019 | Kito | F21V 9/40 |
| 2019/0331997 | A1 * | 10/2019 | Pan | G03B 21/2066 |
| 2019/0346752 | A1 * | 11/2019 | Pan | G02B 26/008 |
| 2019/0346753 | A1 * | 11/2019 | Pan | G03B 21/204 |
| 2019/0353995 | A1 * | 11/2019 | Pan | H04N 9/3155 |
| 2020/0089095 | A1 * | 3/2020 | Lin | G02B 27/28 |
| 2020/0142290 | A1 * | 5/2020 | Lin | G03B 21/2033 |
| 2020/0150520 | A1 * | 5/2020 | Pan | G02B 30/25 |
| 2020/0166826 | A1 * | 5/2020 | Lin | G03B 21/2033 |
| 2020/0192114 | A1 * | 6/2020 | Chen | G02B 27/48 |

FOREIGN PATENT DOCUMENTS

TW            I605295       11/2017

* cited by examiner

*Primary Examiner* — William C. Dowling
(74) *Attorney, Agent, or Firm* — JCIPRNET

(57) ABSTRACT

An illumination system includes a blue light source, an excitation light source, a first light splitting element and a wavelength conversion element. The blue light source provides a blue light beam. The excitation light source provides an excitation light beam. The first light splitting element is disposed on a transmission path of the excitation light beam. The wavelength conversion element is disposed on the transmission paths of a blue light beam and the excitation light beam and includes a columnar diffusion member and a wavelength conversion member respectively located on opposite sides of the wavelength conversion element. The blue light beam passes through the columnar diffusion member, and the excitation light beam passing through the first light splitting element is transmitted to the wavelength conversion member and converted into an excited light beam including a first red light beam and a green light beam.

20 Claims, 13 Drawing Sheets

ILLUMINATION SYSTEM AND PROJECTION APPARATUS

CROSS-REFERENCE TO RELATED APPLICATION

This application claims the priority benefit of China application serial no. 201820690708.8, filed on May 10, 2018 and the priority benefit of China application serial no. 201821951488.6, filed on Nov. 26, 2018. The entirety of each of the above-mentioned patent applications is hereby incorporated by reference herein and made a part of specification.

BACKGROUND

Field of the Invention

The invention is directed to an optical system and an optical apparatus and more particularly, to an illumination system and a projection apparatus.

Description of Related Art

A projection apparatus is a display apparatus for generating a large-sized image and keeps in progress along with the development and innovation of technologies. According to an imaging principle of the projection apparatus, an illumination light beam generated by an illumination system is converted into an image light beam by a light valve, and afterwards, the image light beam passing through a projection lens is projected onto a target object (e.g., a screen or a wall) to form a projection image.

In addition, the illumination system, under market requirements for brightness, color saturation, service life, non-toxic environmental protection and so on, has been developed all the way from an ultra-high-performance lamp (UHP lamp) and a light-emitting diode (LED) to the most advanced laser diode (LD) light source. However, in the illumination system, a relatively cost-effective method for generating red and green light is generating yellow and green light by exciting phosphor powders of a phosphor wheel using a blue LD, which is then filtered by optical elements to obtain red light or green light for use.

However, in a commonly known illumination system structure, two or more color wheels, such as phosphor wheels and/or diffusion color wheels are usually disposed, while two or more color wheels indicates that two or more corresponding parts, including motor devices, driving modules and circuits, are required. Consequently, the cost keeps high, and the volume cannot be reduced, while an issue of poor heat dissipation exists.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an illumination system and a projection apparatus capable of simplifying a structure and reducing a volume.

Other features and advantages of the invention can be further understood by the technical features disclosed in the invention.

To achieve one, part, or all of the objectives aforementioned or other objectives, an embodiment of the invention provides an illumination system including a blue light source, an excitation light source, a first light splitting element and a wavelength conversion element. The blue light source is configured to provide a blue light beam. The excitation light source is configured to provide an excitation light beam. The first light splitting element is disposed on a transmission path of the excitation light beam. The wavelength conversion element is disposed on the transmission path of the excitation light beam and a transmission path of the blue light beam. The wavelength conversion element includes a columnar diffusion member and a wavelength conversion member. The columnar diffusion member and the wavelength conversion member are respectively located on opposite sides of the wavelength conversion element. The blue light beam passes through the columnar diffusion member, and the excitation light beam passing through the first light splitting element is transmitted to the wavelength conversion member and converted into an excited light beam. The excited light beam includes a first red light beam and a green light beam.

To achieve one, part, or all of the objectives aforementioned or other objectives, another embodiment of the invention provides a projection apparatus for providing a projection light beam. The projection apparatus includes an illumination system, at least one light valve and a projection lens module. The illumination system provides an illumination light beam and includes a blue light source, an excitation light source, a first light splitting element and a wavelength conversion element. The blue light source is configured to provide a blue light beam. The excitation light source is configured to provide an excitation light beam. The first light splitting element is disposed on a transmission path of the excitation light beam. The wavelength conversion element is disposed on the transmission path of the excitation light beam and a transmission path of the blue light beam. The wavelength conversion element includes a columnar diffusion member and a wavelength conversion member. The columnar diffusion member and the wavelength conversion member are respectively located on opposite sides of the wavelength conversion element. The at least one light valve is disposed on a transmission path of the illumination light beam, and configured to convert the illumination light beam into at least one image light beam. The projection lens module is disposed on a transmission path of the at least one image light beam, and configured to convert the at least one image light beam into a projection light beam. The blue light beam passes through the columnar diffusion member, the excitation light beam passing through the first light splitting element is transmitted to the wavelength conversion member and converted into an excited light beam, and the excited light beam includes a first red light beam and a green light beam.

Based on the above, the embodiments of the invention achieve at least one of the following advantages or effects. In the embodiments of the invention, the wavelength conversion element is disposed on the transmission paths of the blue light beam and the excitation light beam and includes the columnar diffusion member and the wavelength conversion member. Thus, the illumination system may provide the illumination light beam without being additionally disposed with a color wheel device, so as to simplify the structure of the projection apparatus and reduce the volume thereof.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
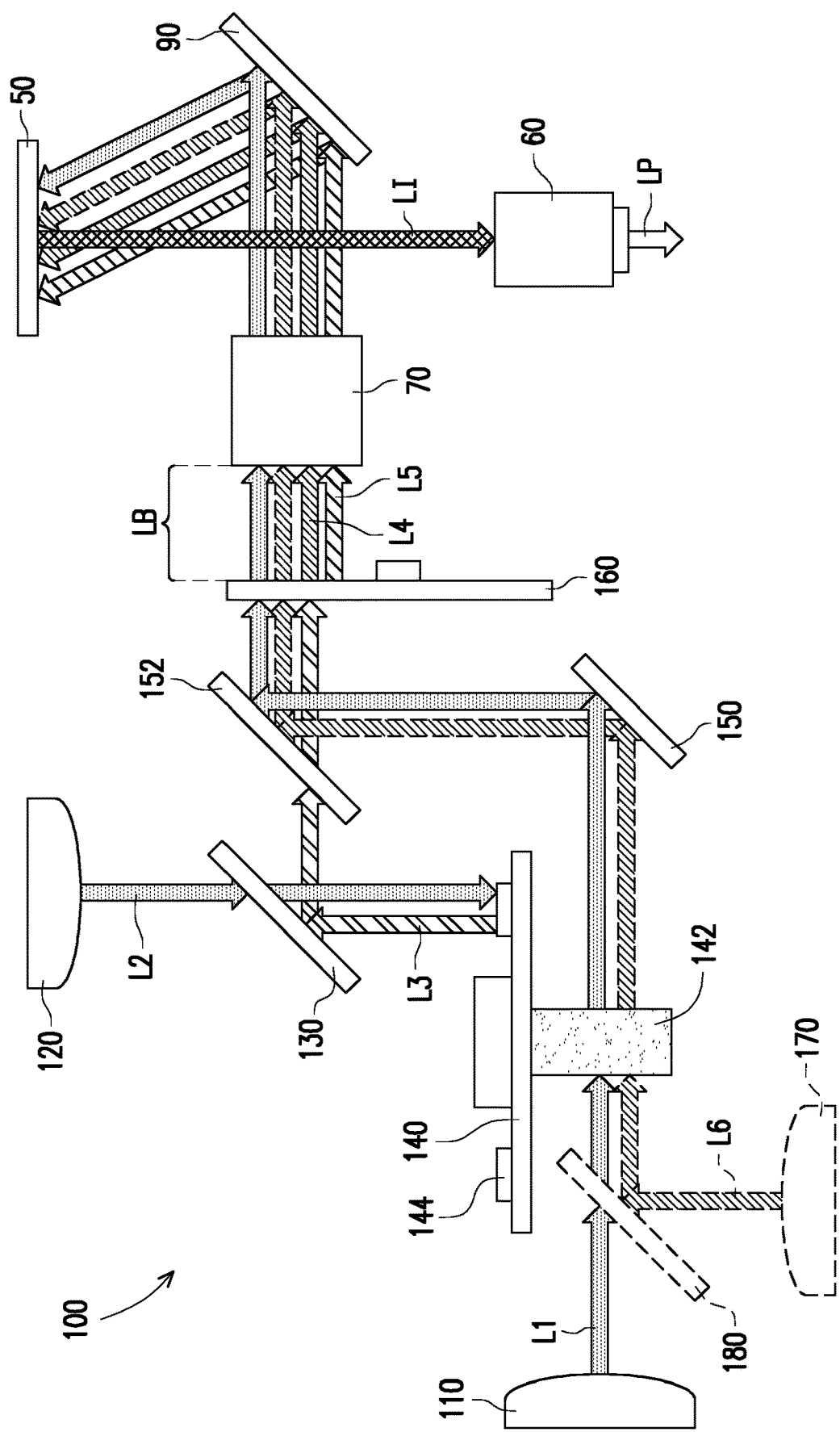
FIG. 1 is a schematic diagram illustrating a projection apparatus according to an embodiment of the invention.

FIG. 1 is a schematic diagram illustrating a projection apparatus according to an embodiment of the invention. Referring to FIG. 1, in the embodiment, a projection apparatus 10 is configured to provide a projection light beam LP. Specifically, the projection apparatus 10 includes an illumination system 100, at least one light valve 50 and a projection lens module 60. The illumination system 100 is configured to provide an illumination light beam LB. The light valve 50 is disposed on a transmission path of the illumination light beam LB, and configured to convert the illumination light beam LB into at least one image light beam LI. In other words, the so-called illumination light beam LB refers to a light beam which is provided to the light valve 50 by the illumination system 100 at any time, for example, a blue light beam L1 provided by a blue light source, an excited light beam L3 converted by a wavelength conversion element 140 or a combination thereof. The projection lens module 60 is disposed on a transmission path of the image light beam LI, and configured to covert the image light beam LI into the projection light beam LP which is used to be projected to a projection target (not shown), for example, a screen or a wall.

In the embodiment, the light valve 50 is a reflective optical modulator, for example, a liquid crystal on silicon (LCoS) panel or a digital micro-mirror device (DMD). In some embodiments, the light valve 50 may also be a transmissive optical modulator, for example, a transparent liquid crystal panel, an electro-optical modulator, a maganeto-optic modulator or an acousto-optic modulator (AOM). The aspect and the type of the light valve 50 are not particularly limited in the invention. Regarding the method for converting the illumination light beam LB into the image light beam LI by the light valve 50, teaching, suggestion and implementation instructions with respect to the detailed steps and the implementation thereof may be obtained based on the common knowledge in the technical field, and thus, will not be repeated. In the embodiment, the number of the at least one light valve 50 is one, for example, the projection apparatus 10 using a single DMD (1-DMD). However, the number may be plural in other embodiments, which is not limited in the invention.

The projection lens module 60 includes, for example, a combination of one or more optical lenses having diopters, for example, non-planar lenses, such as bi-concave lenses, lenticular lenses, meniscus lenses, convex-concave lenses, plano-convex lenses, and plano-concave lenses in various kinds of combinations. In an embodiment, the projection lens module 60 may also include planar optical lenses for projecting the image light beam LI from the light valve 50 to a projection target in a reflective or a transmissive manner. The aspect and the type of the projection lens module 60 are not particularly limited in the invention.

In the embodiment, the projection apparatus 10 may further include a light uniformizing element 70 disposed on the transmission path of the illumination light beam LB, and configured to adjust a light-spot shape of the illumination light beam LB, such that the light-spot shape of the illumination light beam LB may meet a shape (e.g., a rectangular shape) of an working region of the light valve 50, and light-spots everywhere may have consistent or similar light intensity. In the embodiment, the light uniformizing element 70 is, for example, an integrator. However, in other embodiments, the light uniformizing element 70 may also be any other suitable optical element, and the invention is not limited thereto.

Additionally, in some embodiments, the projection apparatus 10 may further selectively include a condensing element (not shown) and a reflection element 90. The condensing element and the reflection element 90 are configured to guide the illumination light beam LB emitted from the illumination system 100 to the light valve 50. However, the invention is not limited thereto, and in other embodiments, the illumination light beam LB may also be guided to the light valve 50 by using other optical elements.

The illumination system 100 includes a blue light source 110, an excitation light source 120, a first light splitting element 130 and a wavelength conversion element 140. Optical elements 150 and 152 may be selectively disposed for guiding light paths and may respectively be a reflector and a light-splitter, which are not limited in the invention. Specifically, the blue light source 110 provides the blue light beam L1, and the excitation light source 120 provides an excitation light beam L2. In the embodiment, the blue light source 110 and the excitation light source 120 are laser diodes (LDs). However, in other embodiments, the blue light source 110 and the excitation light source 120 may be light-emitting diodes (LEDs) or organic light emitting diodes (OLEDs). Specifically, all light sources which meet requirements for actual designs may be implemented, the aspects and the types of the blue light source 110, the excitation light source 120 and other light sources that will be described below are not particularly limited in the invention.

In the embodiment, the blue light beam L1 is, for example, a blue light beam with a wavelength of 460 nanometers (nm), and the excitation light beam L2 is, for example, a blue light beam with a wavelength of 445 nm. In other words, the wavelength of the blue light beam L1 is greater than that of the excitation light beam L2, and in other embodiments, the wavelength of the blue light beam L1 may also be the same as that of the excitation light beam L2, which is not limited in the invention. In the embodiment, the blue light beam L1 is employed to provide a blue light portion of the projection light beam LP, and the excitation light beam L2 is employed to excite a wavelength conversion material of the wavelength conversion element 140 to provide a yellow light portion, a green light portion and a red light portion of the projection light beam LP. In this way, an issue of a purplish image resulted from a provided blue light portion which is purplish may be prevented, so as to improve optical quality of the projection apparatus 10. In the embodiment, the blue light source 110 and the excitation light source 120 are respectively located at opposite sides of the wavelength conversion element 140.

Figure 2:
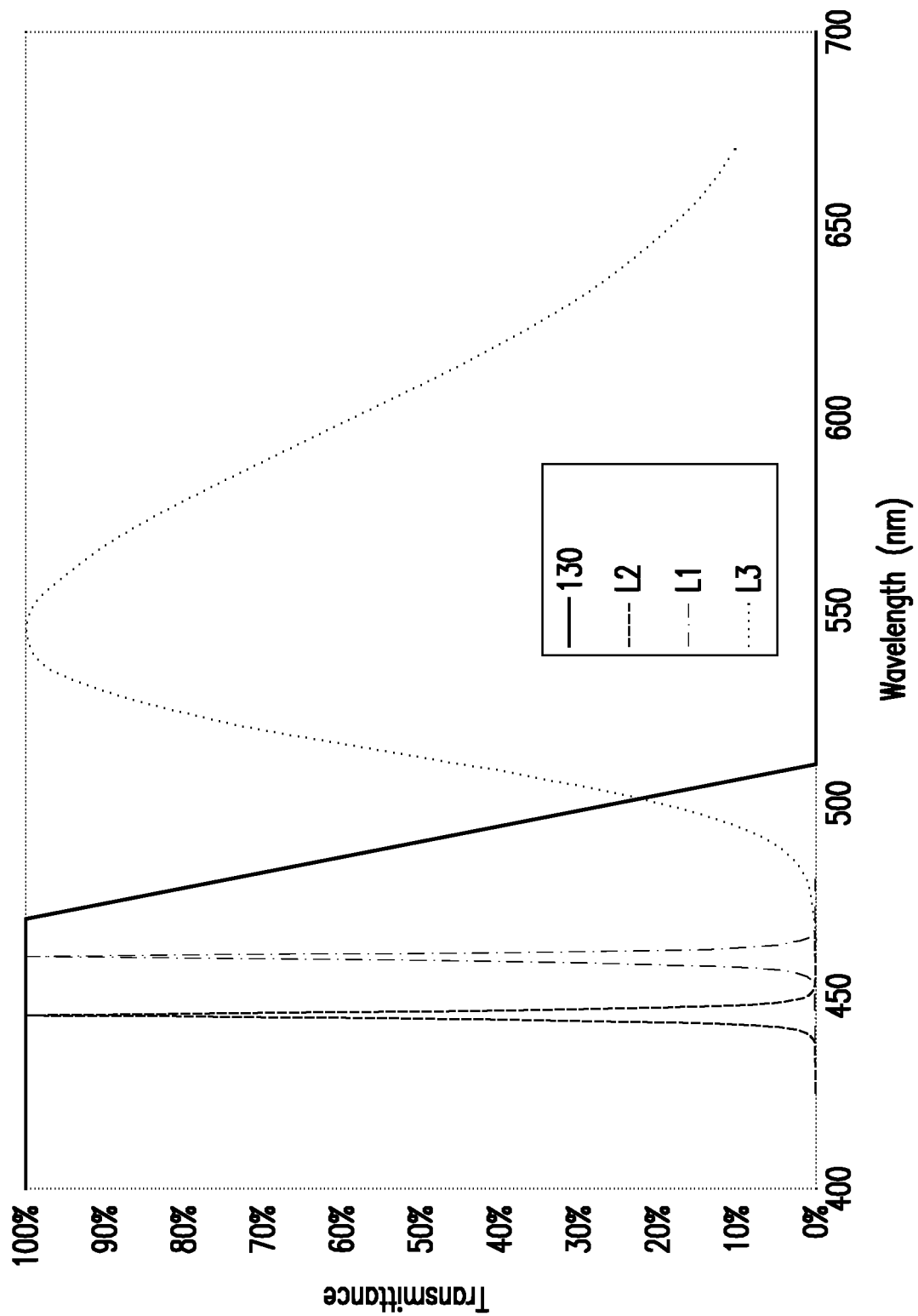
FIG. 2 is a spectrum diagram of the first light splitting element of the projection apparatus depicted in FIG. 1.
Figure 3:
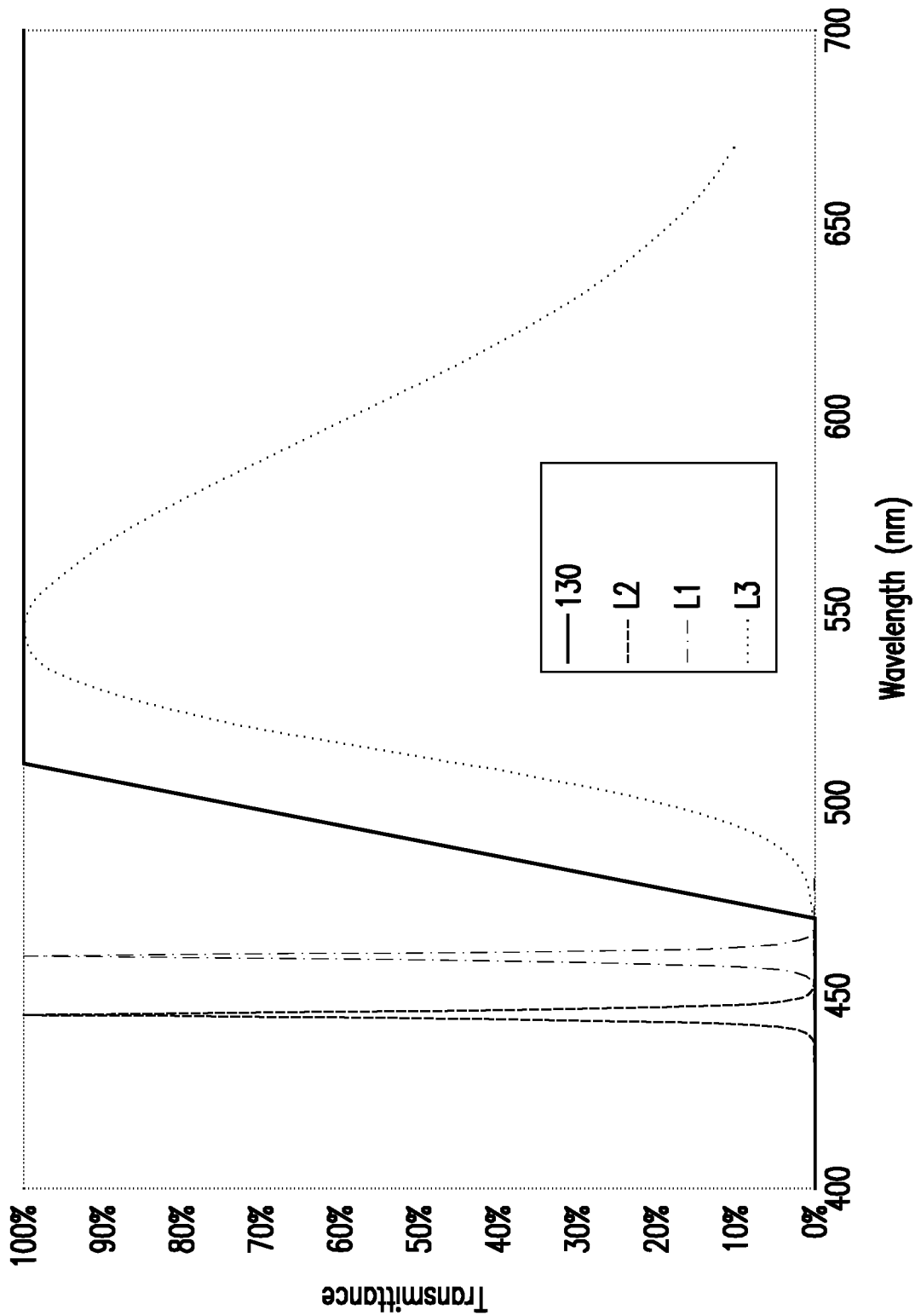
FIG. 3 is a spectrum diagram of the optical elements of the projection apparatus depicted in FIG. 1.

FIG. 2 is a spectrum diagram of the first light splitting element of the projection apparatus depicted in FIG. 1. FIG. 3 is a spectrum diagram of the optical elements of the projection apparatus depicted in FIG. 1. Referring to FIG. 1 to FIG. 3, the first light splitting element 130 is disposed on a transmission path of the excitation light beam L2. In the embodiment, the first light splitting element 130 is a dichroic mirror with yellow reflect (DMY), as illustrated in FIG. 2. However, the invention is not limited thereto, and according to other embodiments, the first light splitting element 130 may be other types or aspects, which will be described with reference to other embodiments below. Additionally, in the embodiment, the optical element 152 selects a dichroic mirror with blue reflect (DMB), as illustrated in FIG. 3.

Figure 4A:
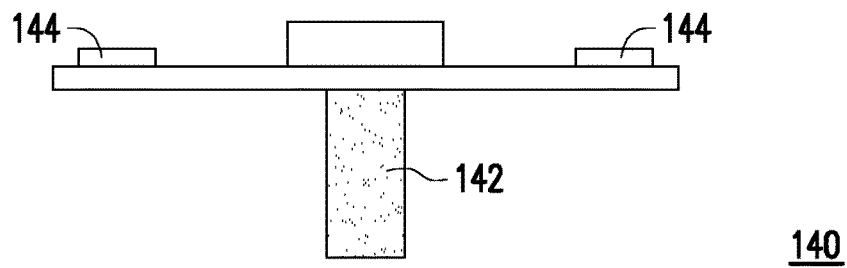
FIG. 4A to FIG. 4C are respectively a schematic side-view diagram, a top-view diagram and a bottom-view diagram illustrating the wavelength conversion element of the projection apparatus depicted in FIG. 1.
Figure 4B:
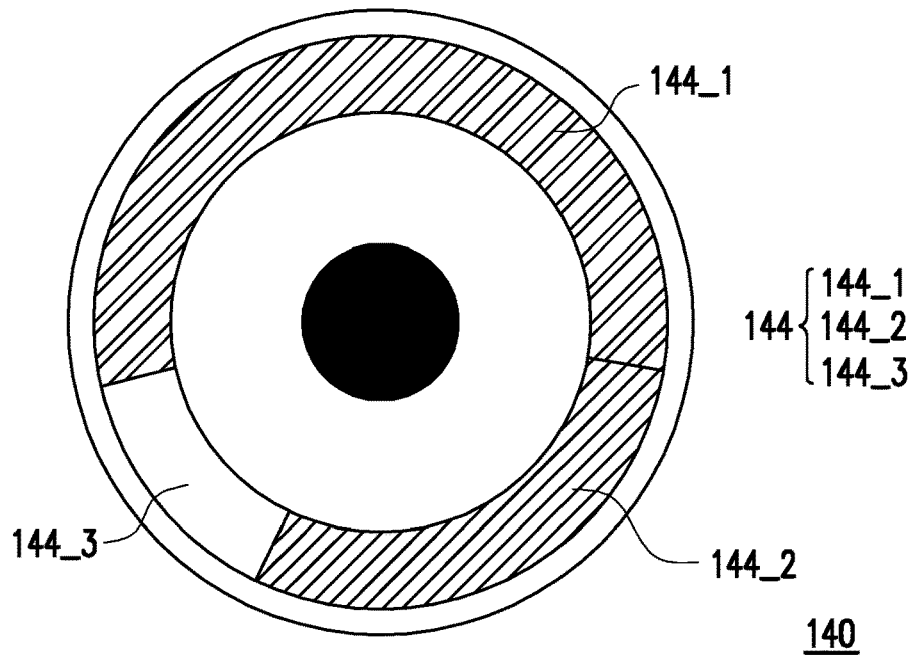
Figure 4C:
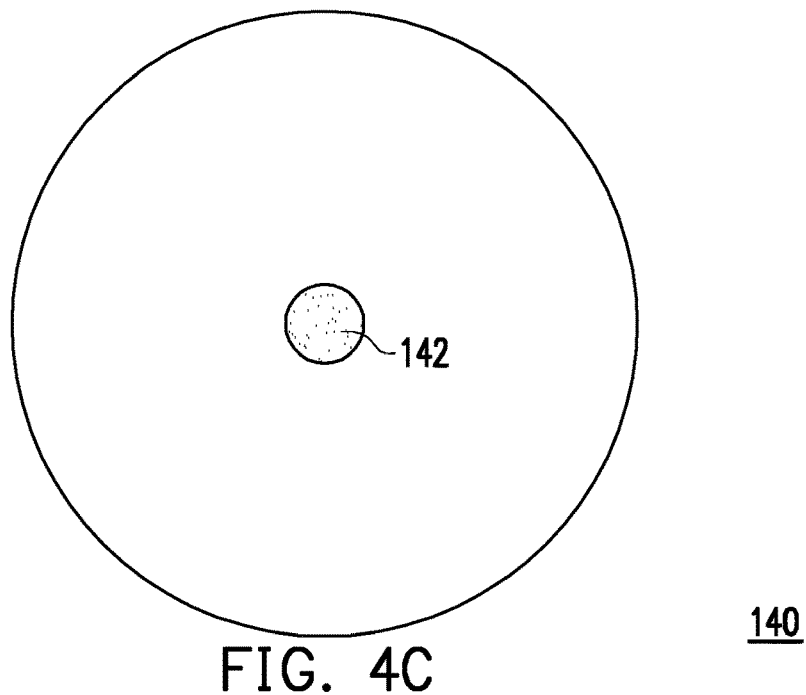

FIG. 4A to FIG. 4C are respectively a schematic side-view diagram, a top-view diagram and a bottom-view diagram illustrating the wavelength conversion element of the projection apparatus depicted in FIG. 1. Referring to FIG. 1 and FIG. 4A to FIG. 4C, in the embodiment, the wavelength conversion element 140 is, for example, a rotatable color wheel structure disposed on the transmission paths of the blue light beam L1 and the excitation light beam L2 and includes a columnar diffusion member 142 and a wavelength conversion member 144. The columnar diffusion member 142 and the wavelength conversion member 144 are respectively located on opposite sides of the wavelength conversion element 140, and the columnar diffusion member 142 and the wavelength conversion member 144 are distributed in a concentric circle manner on the wavelength conversion element 140, as illustrated in FIG. 4B and FIG. 4C. Specifically, the columnar diffusion member 142 of the embodiment is located on an axial center of the wavelength conversion element 140 (i.e., a circle center of the wavelength conversion member 144).

To be detailed, the columnar diffusion member 142 is a columnar structure protruding from a surface of the wavelength conversion element 140. In order to reduce the weight, the wavelength conversion element 140 may be a hollow columnar structure to have less inertia and is capable of saving energy consumption while rotating, but the invention is not limited thereto. Thus, in, use, the blue light beam L1 passing through the columnar diffusion member 142 is guided by the optical elements 150 and 152 and transmitted to an optical engine portion of the projection apparatus 10. In this way, the blue light beam L1 may be diffused and uniformized with the columnar diffusion member 142. In the embodiment, the optical element 150 is the same as the reflection element 90, for example, but the invention is not limited thereto.

On the other hand, the wavelength conversion member 144 is, for example, a wavelength conversion material and is disposed in a coating manner on another side of the wavelength conversion element 140, the wavelength conversion material is employed to convert the excitation light beam L2 into an excited light beam L3, and the excited light beam L3 includes a first red light beam L4 and a green light beam L5. To be detailed, in the embodiment, the wavelength conversion member 144 includes a first conversion region 144_1, a second conversion region 144_2 and a non-excitation region 144_3. The first conversion region 144_1 is, for example, a yellow-light conversion material employed to convert the excitation light beam L2 into the excited light beam L3 presenting yellow light. The second conversion region 144_2 is, for example, a green-light conversion material employed to convert the excitation light beam L2 into the excited light beam L3 presenting the green light. The non-excitation region 144_3 is, for example, a region having no wavelength conversion material, and thus, the wavelength conversion material may be further omitted, but the invention is not limited thereto. In other words, the illumination system 100 combines commonly known diffusion color wheel and phosphor wheel, thereby, providing the illumination light beam LB without any additionally disposed color wheel device, which may simplify the structure of the projection apparatus 10 and reduce its volume.

Figure 5:
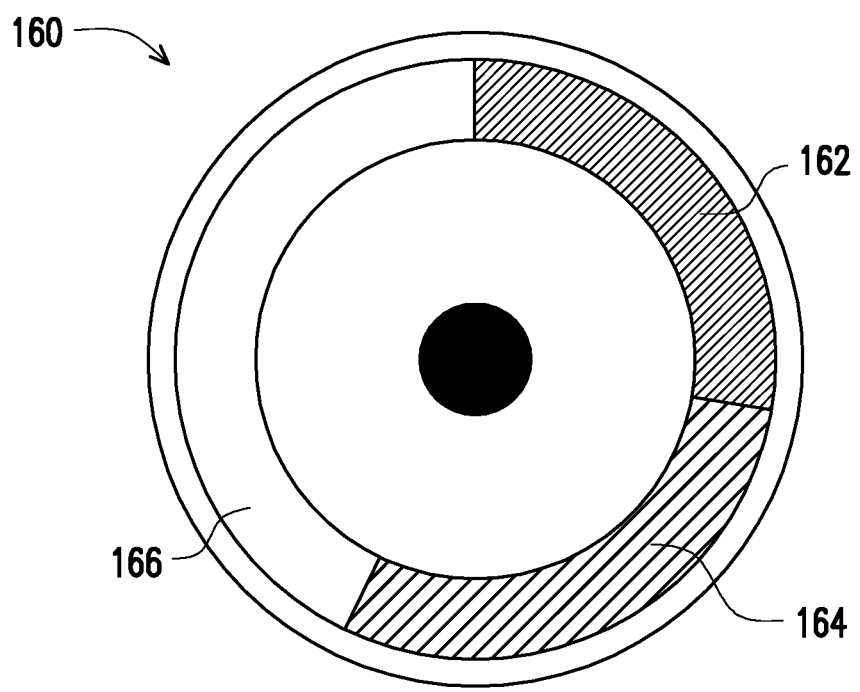
FIG. 5 is a schematic top-view diagram of the light filter element of the projection apparatus depicted in FIG. 1.

FIG. 5 is a schematic top-view diagram of the light filter element of the projection apparatus depicted in FIG. 1. Referring to FIG. 1 and FIG. 5, in the embodiment, the optical engine portion of the projection apparatus 10 may further include a light filter element 160. To be detailed, the light filter element 160 is disposed on the transmission path of the blue light beam L1 and a transmission path of the excited light beam L3, and the excited light beam L3 is transmitted to the first light splitting element 130 and reflected to the light filter element 160 by the first light splitting element 130 to generate the red, the green or the yellow light portion. To be detailed, in the embodiment, the light filter element 160 includes, for example, a first light filter region 162, a second light filter region 164 and a transparent region 166. The excited light beam L3 passing through the first light filter region 162 is converted into the first red light beam L4, and the excited light beam L3 passing through the second light filter region 164 is converted into the green light beam L5. However, in other embodiments, a disposition ratio of the first light filter region 162, the second light filter region 164 and the transparent region 166 may vary based on requirements, and the invention is not limited thereto. Regarding the method for filtering the excited light beam L3 and converting them into the red, the green or the yellow light portion of the image light beam LI by the light filter element 160, teaching, suggestion and implementation instructions with respect to the detailed steps and the implementation thereof may be obtained based on the common knowledge in the technical field, and thus, will not be repeated.

In the embodiment, the number of the at least one light valve 50 of the projection apparatus 10 is one. For example, the projection apparatus 10 uses a single DMD (1-DMD). Thus, the illumination system 100 may rotates the wavelength conversion element 140 according to different timing sequences to generate the illumination light beam LB of the light in different colors in different timing sequences, for example, the blue light beam L1, the excited light beam L3, the first red light beam L4, the green light beam L5 or a white light beam (not shown), such that the projection apparatus 10 provides the projection light beam LP. Regarding the method for respectively changing the blue light source 110 and the excitation light source 120 of the illumination system 100 to a turned-on, a turned-off or a power saving state according to different timing sequences to achieve changing the light beams received by the light valve 50 according to the timing sequences and generating the illumination light beam LB having the light in different colors according to different timing sequences, teaching, suggestion and implementation instructions with respect to the detailed steps and the implementation thereof may be obtained based on the common knowledge in the technical field, and thus, will not be repeated.

Figure 6:
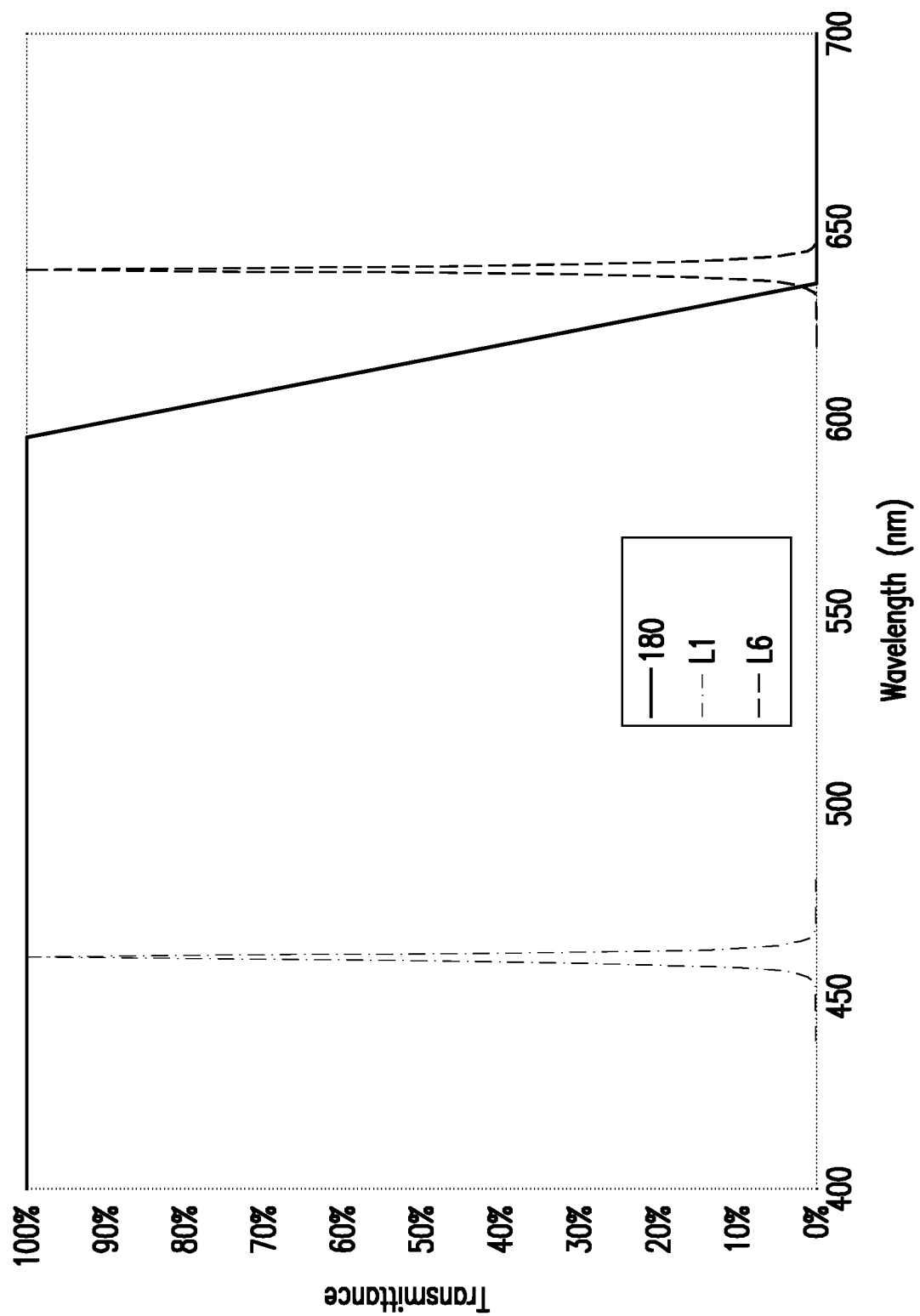
FIG. 6 is a spectrum diagram of a second light splitting element of the projection apparatus depicted in FIG. 1.
Figure 7:
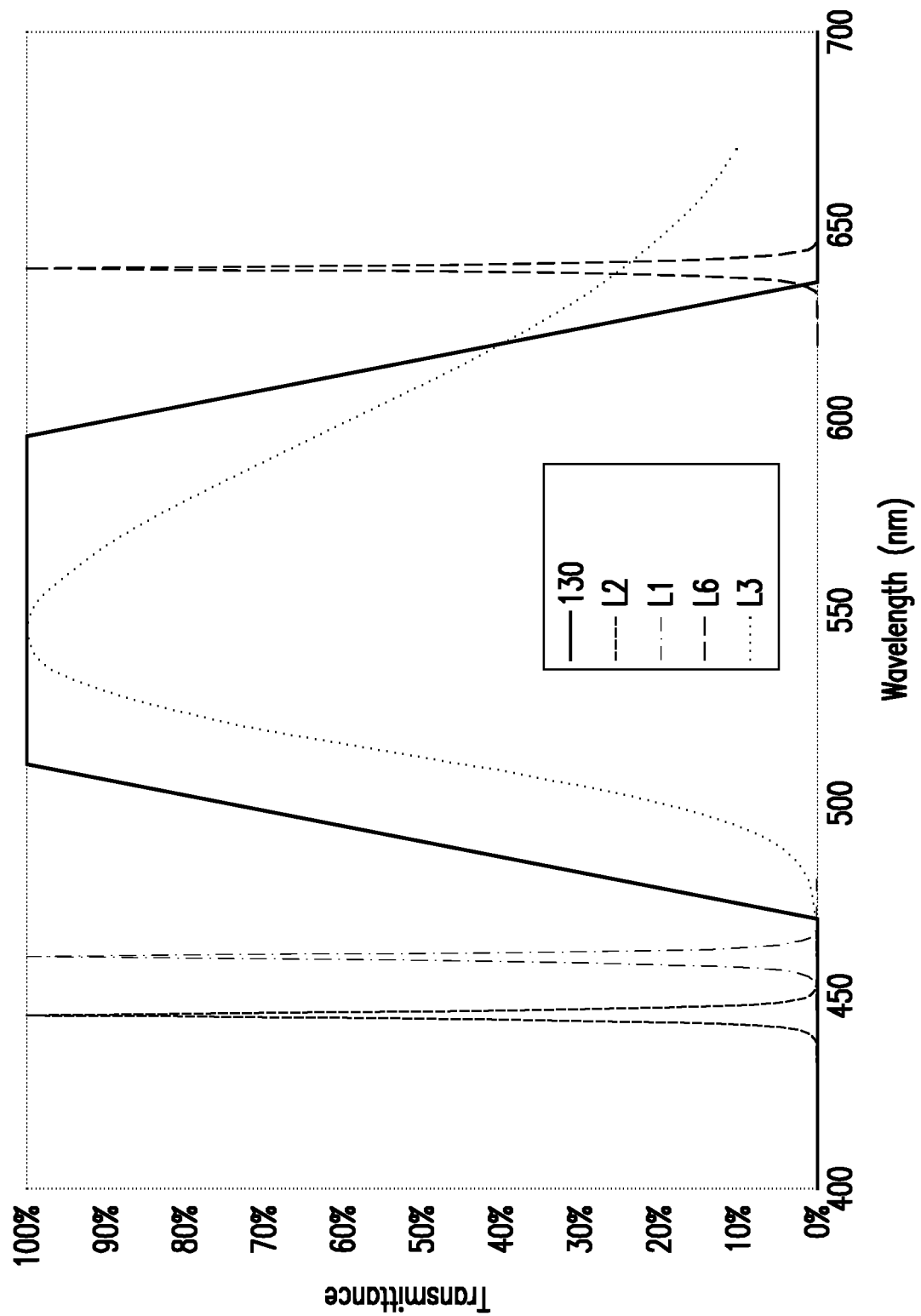
FIG. 7 is a spectrum diagram of the first light splitting element of the projection apparatus depicted in FIG. 1 according to another embodiment of the invention.

FIG. 6 is a spectrum diagram of a second light splitting element of the projection apparatus depicted in FIG. 1. FIG. 7 is a spectrum diagram of the first light splitting element of the projection apparatus depicted in FIG. 1 according to another embodiment of the invention. Referring to FIG. 1, FIG. 6 and FIG. 7, in the embodiment, the illumination system 100 may further include a red light source 170 and a second splitting element 180. The red light source 170 provides a second red light beam L6. The second splitting element 180 is a dichroic mirror with red reflect (DMR), as illustrated in FIG. 6, and is disposed on the transmission path of the blue light beam L1 and a transmission path of the second red light beam L6. The optical element 152 selects a dichroic mirror with blue reflect (DMB), as illustrated in FIG. 7, and the first light splitting element 130 and the second splitting element 180 are respectively located at opposite sides of the wavelength conversion element 140, wherein the second red light beam L6 passes through the columnar diffusion member 142. In this way, the second red light beam L6 may be diffused and uniformized with the columnar diffusion member 142. In the embodiment, the second splitting element 180 is configured to allow the blue light beam L1 to pass through and reflect the second red light beam L6. However, in other embodiments, the second splitting element 180 may also select a light-splitter configured to allow the second red light beam L6 to pass through and reflect the blue light beam L1, and the invention is not limited thereto. Regarding the usage of the red light source 170 when the illumination system 100 is in the turned-on or the turned-off state, teaching, suggestion and implementation instructions with respect to the detailed steps and the implementation thereof may be obtained based on the common knowledge in the technical field, and thus, will not be repeated.

Figure 8:
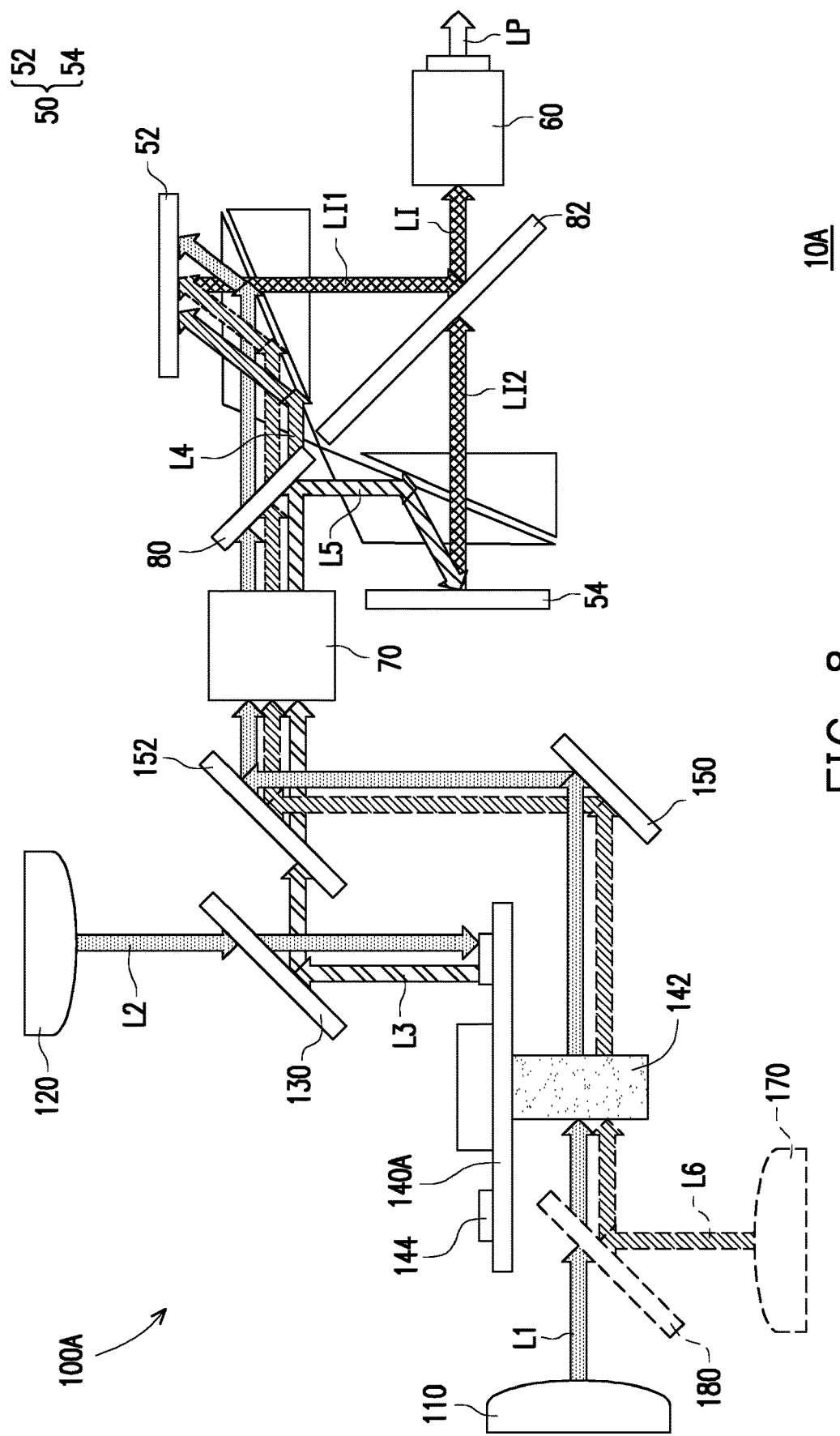
FIG. 8 is a schematic diagram illustrating a projection apparatus according to another embodiment of the invention.
Figure 9:
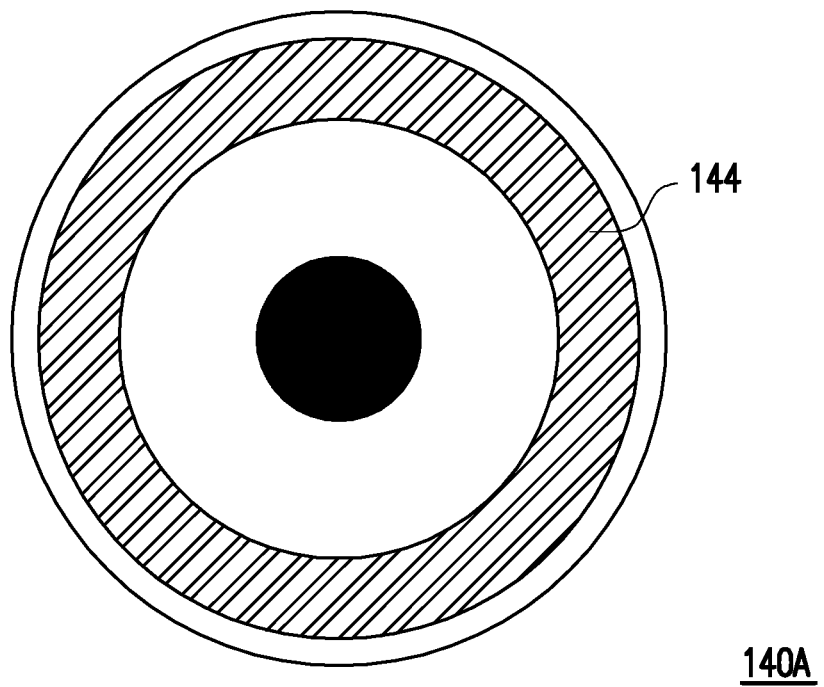
FIG. 9 is a schematic top-view diagram of the wavelength conversion element of the projection apparatus depicted in FIG. 8.

FIG. 8 is a schematic diagram illustrating a projection apparatus according to another embodiment of the invention. FIG. 9 is a schematic top-view diagram of the wavelength conversion element of the projection apparatus depicted in FIG. 8. Referring to FIG. 8 and FIG. 9, a projection apparatus 10A of the embodiment is similar to the projection apparatus 10 illustrated in FIG. 1. However, the difference therebetween is as follows. In the embodiment, the at least one light valve 50 of the projection apparatus 10A includes a first light valve 52 and a second light valve 54, for example, the projection apparatus 10A using dual DMDs (2-DMDs). In addition, the projection apparatus 10A further includes at least one light filter 80 disposed on the transmission path of the excited light beam L3, and configured to allow one of the first red light beam L4 and the green light beam L5 to pass through, transmit the one to the first light valve 52, reflect the other one and transmit the other one to the second light valve 54. Additionally, in the embodiment, a partition of the wavelength conversion member 144 of a wavelength conversion element 140A is a single continuous area. In other words, the wavelength conversion member 144 has only one single conversion region, as illustrated in FIG. 9. Thus, the manufacturing process of the wavelength conversion element 140A may be simplified. In the embodiment, the first light valve 52 and the second light valve 54 respectively form a first sub image light beam LI1 and a second sub image light beam LI2 and provide them to the projection lens module 60. Regarding the manner that the blue light source 110 and the excitation light source 120 of an illumination system 100A are respectively changed to the turned-on, the turned-off or the power saving state according to different timing sequences, teaching, suggestion and implementation instructions with respect to the detailed steps and the implementation thereof may be obtained based on the common knowledge in the technical field, and thus, will not be repeated.

Figure 10:
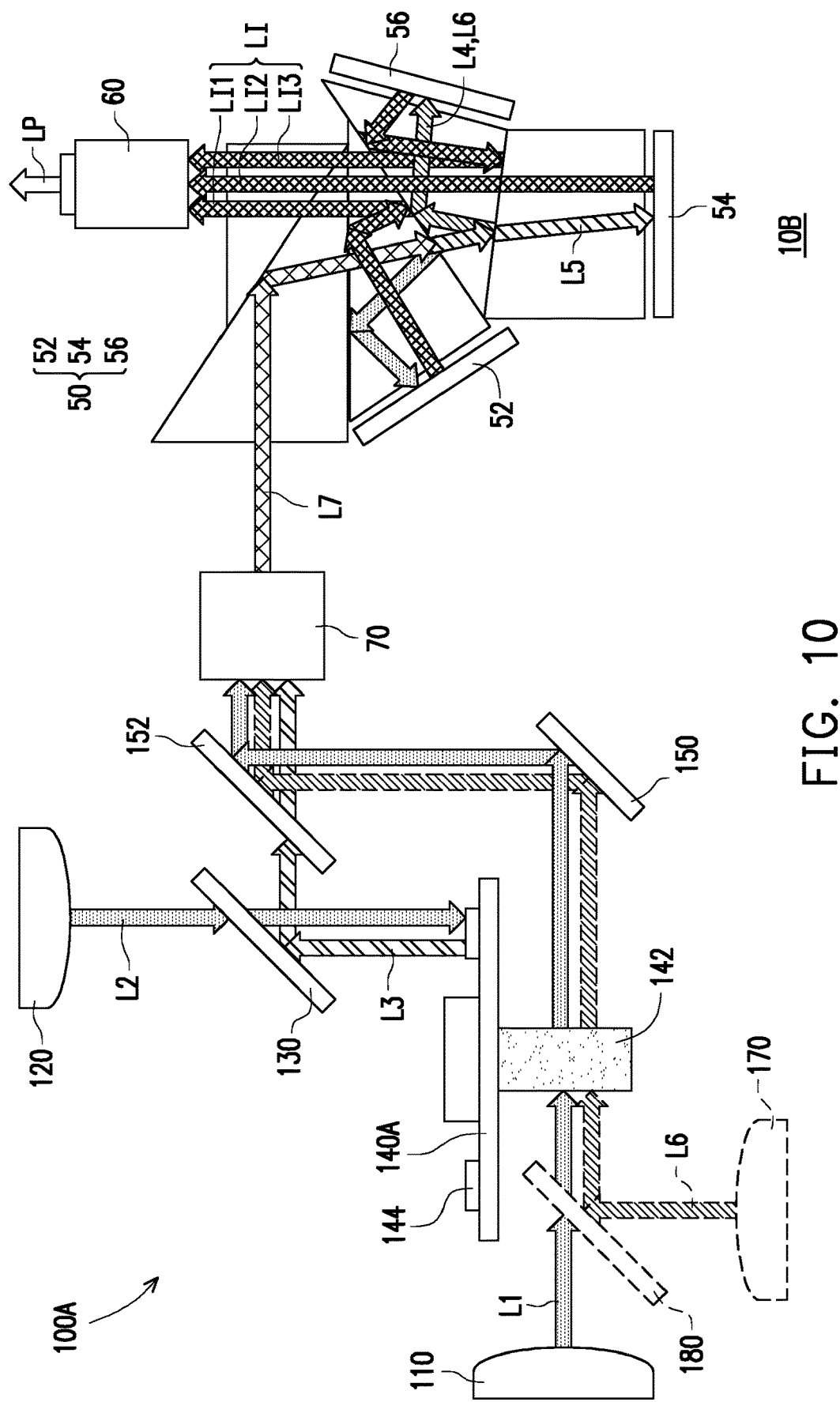
FIG. 10 is a schematic diagram illustrating a projection apparatus according to another embodiment of the invention.

FIG. 10 is a schematic diagram illustrating a projection apparatus according to another embodiment of the invention. Referring to FIG. 10, a projection apparatus 10B of the embodiment is similar to the projection apparatus 10A illustrated in FIG. 9. However, the difference therebetween is as follows. In the embodiment, the at least one light valve 50 of the projection apparatus 10B includes a first light valve 52, a second light valve 54 and a third light valve 56, for example, a projection apparatus 10B using three DMDs (3-DMDs). Additionally, in the embodiment, both the blue light source 110 and the excitation light source 120 are in the turned-on, the turned-off or the power saving state. As the blue light source 110 and the excitation light source 120 do not have to be changed to the turned-on, the turned-off or the power saving state according to different timing sequences, the illumination light beam LB provided by the illumination system 100A passing through the light uniformizing element 70 generates a mixed light beam L7. The mixed light beam L7 may respectively form and provide the blue light beam L1, the green light beam L5 and the first red light beam L4 to the first light valve 52, the second light valve 54 and the third light valve 56 by means of light splitting of different optical elements in the projection apparatus 10B, such that the first light valve 52, the second light valve 54 and the third light valve 56 respectively form the first sub image light beam LI1, the second sub image light beam LI2 and a third sub image light beam LI3 and provide them to the projection lens module 60.

Figure 11:
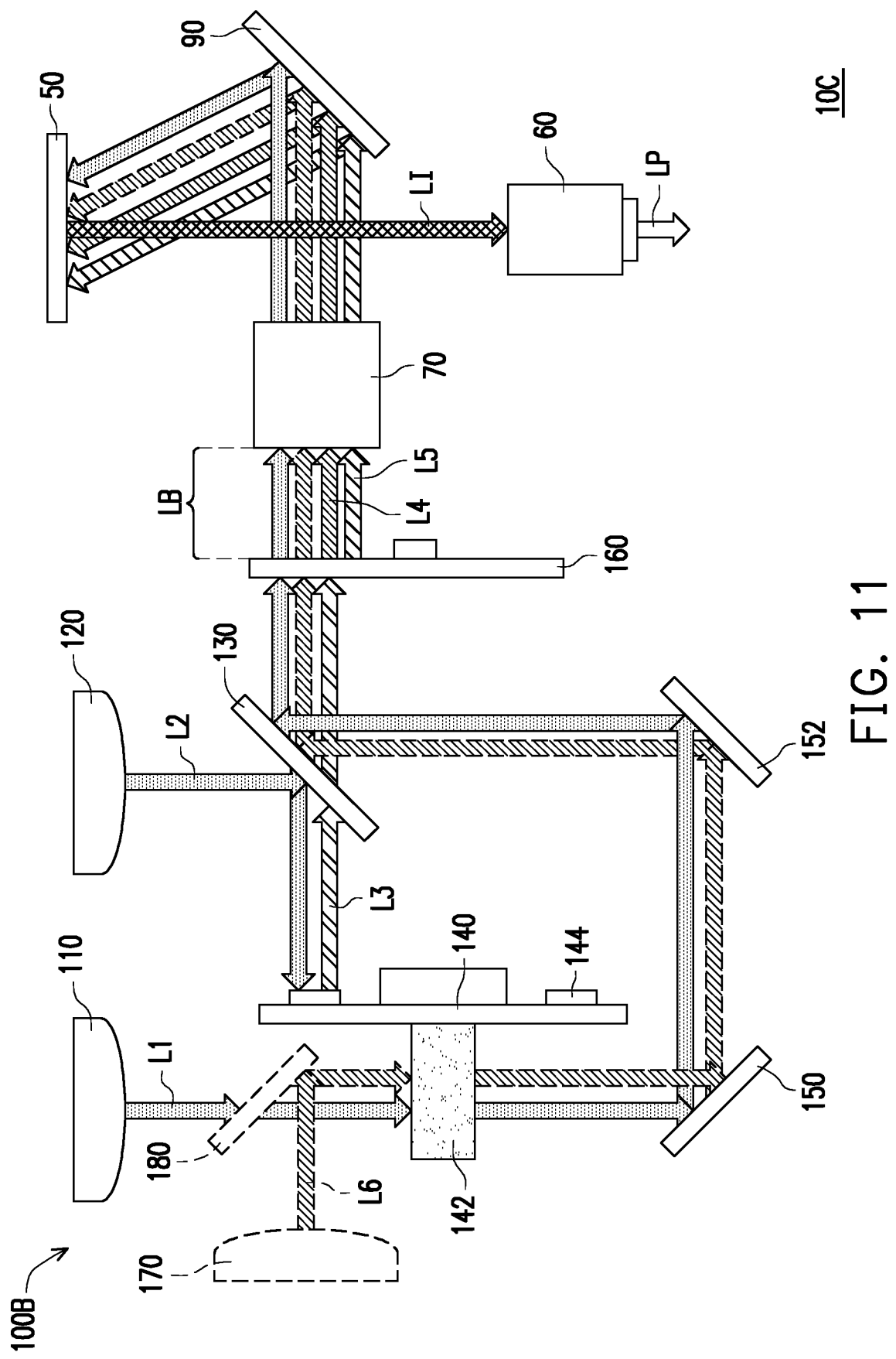
FIG. 11 is a schematic diagram illustrating a projection apparatus according to another embodiment of the invention.

FIG. 11 is a schematic diagram illustrating a projection apparatus according to another embodiment of the invention. Referring to FIG. 11, a projection apparatus 10C of the embodiment is similar to the projection apparatus 10 illustrated in FIG. 1. However, the difference therebetween is as follows. In the embodiment, an illumination system 100B of the projection apparatus 10C is different from the illumination system 100 illustrated in FIG. 1. To be detailed, the first light splitting element 130 of the embodiment is a DMY, as illustrated in FIG. 3. In the embodiment where the red light source 170 and the second splitting element 180 are provided, the first light splitting element 130 uses a dichroic mirror with blue and red reflect (DMBR), as illustrated in FIG. 7. Additionally, in the embodiment, the optical elements 150 and 152 may be selectively disposed for guiding light paths and both may respectively be, for example, reflectors, but the invention is not limited thereto.

Thus, the blue light beam L1 emitted by the blue light source 110 passes through the columnar diffusion member 142 of the wavelength conversion element 140 and is reflected to the light filter element 160 by the optical elements 150 and 152 and the first light splitting element 130. The excitation light beam L2 emitted by the excitation light source 120 is reflected to the wavelength conversion member 144 of the wavelength conversion element 140 by the first light splitting element 130 to generate the excited light beam L3. The excited light beam L3 passing through the second light filter region 164 is transmitted to the light filter element 160. When the projection apparatus 10C is used, teaching, suggestion and implementation instructions with respect to the detailed steps and the implementation thereof may be obtained based on the common knowledge in the technical field, and thus, will not be repeated.

Figure 12:
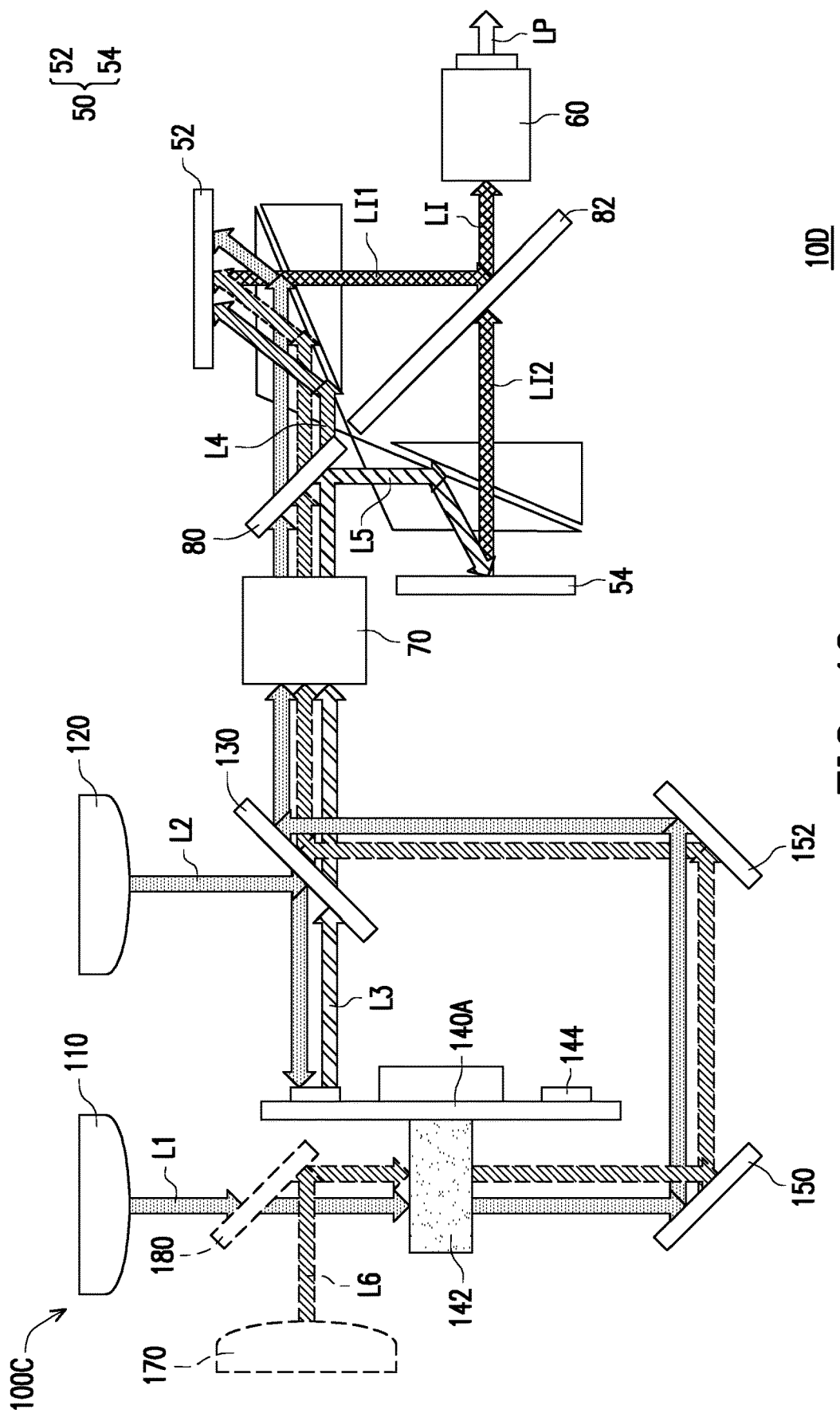
FIG. 12 is a schematic diagram illustrating a projection apparatus according to another embodiment of the invention.

FIG. 12 is a schematic diagram illustrating a projection apparatus according to another embodiment of the invention. Referring to FIG. 12, a projection apparatus 10D of the embodiment is similar to the projection apparatus 10A illustrated in FIG. 8. However, the difference therebetween is as follows. In the embodiment, an illumination system 100C of the projection apparatus 10D is different from the illumination system 100A illustrated in FIG. 8. To be detailed, the illumination system 100C of the embodiment uses one similar to the illumination system 100B illustrated in FIG. 11. The difference therebetween lies in that the wavelength conversion element 140A is one whose wavelength conversion member 144 is a single continuous area. When the projection apparatus 10D is used, teaching, suggestion and implementation instructions with respect to the detailed steps and the implementation thereof may be obtained based on the common knowledge in the technical field, and thus, will not be repeated.

Figure 13:
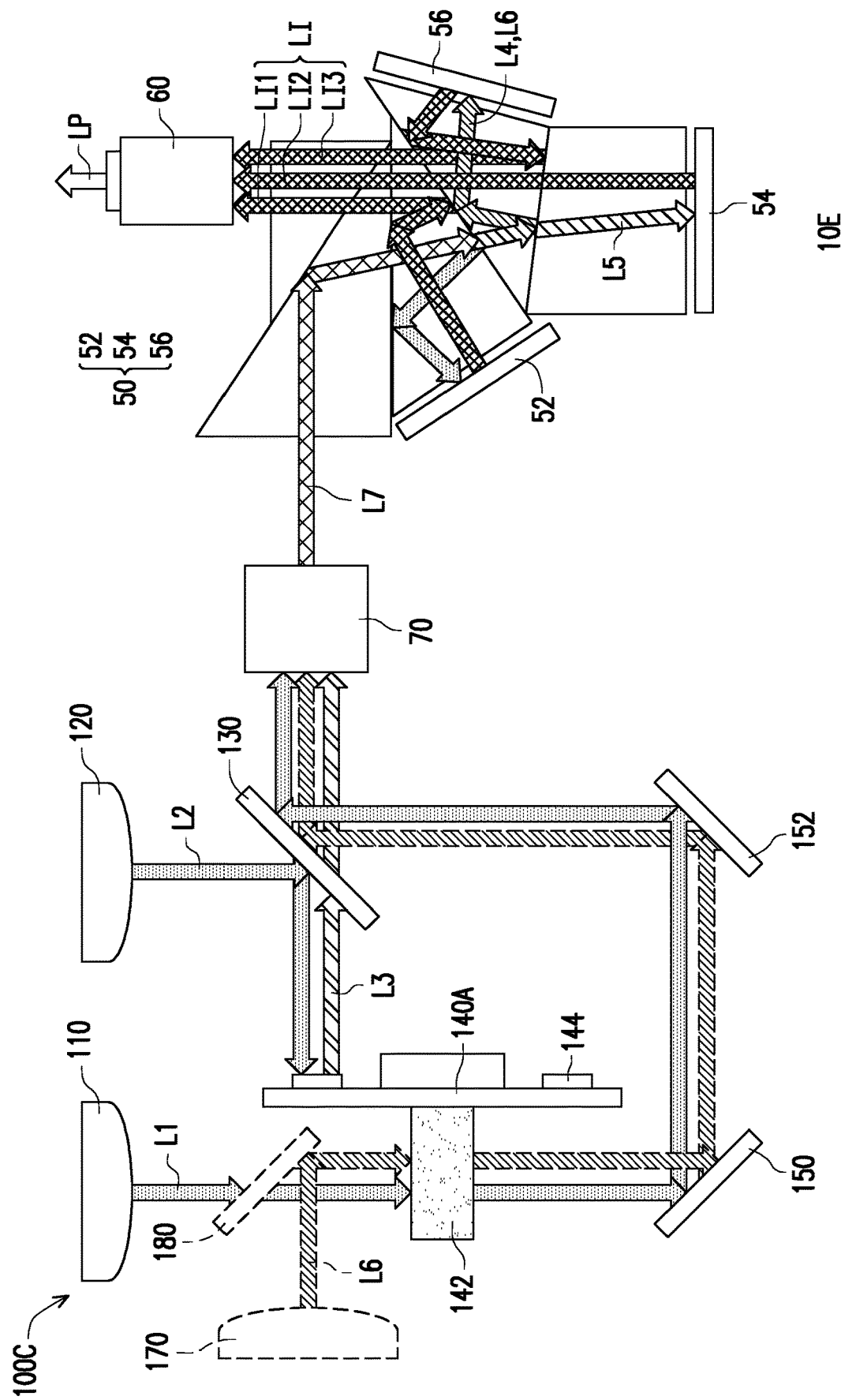
FIG. 13 is a schematic diagram illustrating a projection apparatus according to another embodiment of the invention.

FIG. 13 is a schematic diagram illustrating a projection apparatus according to another embodiment of the invention. Referring to FIG. 13, a projection apparatus 10E of the embodiment is similar to the projection apparatus 10B illustrated in FIG. 10. However, the difference therebetween is as follows. In the embodiment, the illumination system 100C of the projection apparatus 10E is different from the illumination system 100A illustrated in FIG. 10. To be detailed, the illumination system 100C of the embodiment uses one similar to the illumination system 100C illustrated in FIG. 12. When the projection apparatus 10E is used, teaching, suggestion and implementation instructions with respect to the detailed steps and the implementation thereof may be obtained based on the common knowledge in the technical field, and thus, will not be repeated.

Based on the above, the embodiments of the invention can achieve at least one of the following advantages or effects. In the embodiments of the invention, the wavelength conversion element is disposed on the transmission paths of the blue light beam and the excitation light beam and includes the columnar diffusion member and the wavelength conversion member. Thus, the illumination system may provide the illumination light beam without being additionally disposed with a color wheel device, so as to simplify the structure and reduce the volume.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. An illumination system, comprising:
a blue light source, configured to provide a blue light beam;
an excitation light source, configured to provide an excitation light beam;
a first light splitting element, disposed on a transmission path of the excitation light beam; and
a wavelength conversion element, disposed on the transmission path of the excitation light beam and a transmission path of the blue light beam, and comprising a columnar diffusion member and a wavelength conversion member, wherein the columnar diffusion member and the wavelength conversion member are respectively located on opposite sides of the wavelength conversion element, the blue light beam passes through the columnar diffusion member, the excitation light beam passing through the first light splitting element is transmitted to the wavelength conversion member and converted into an excited light beam, and the excited light beam comprises a first red light beam and a green light beam.

2. The illumination system of claim 1, wherein the columnar diffusion member is a hollow columnar structure.

3. The illumination system of claim 1, wherein a wavelength of the blue light beam is greater than or equal to a wavelength of the excitation light beam.

4. The illumination system of claim 1, wherein the columnar diffusion member and the wavelength conversion member are distributed in a concentric circle manner on the wavelength conversion element.

5. The illumination system of claim 1, wherein a partition of the wavelength conversion member is a single continuous area.

6. The illumination system of claim 1, wherein the blue light source and the excitation light source are respectively located at opposite sides of the wavelength conversion element.

7. The illumination system of claim 1, further comprising:
a red light source, configured to provide a second red light beam; and
a second splitting element, disposed on the transmission path of the blue light beam and a transmission path of the second red light beam, wherein the second red light beam passes through the columnar diffusion member.

8. The illumination system of claim 1, wherein the first light splitting element disposes on the transmission path of the blue light beam.

9. A projection apparatus, configured to provide a projection light beam, comprising:
an illumination system, configured to provide an illumination light beam and comprising:
a blue light source, configured to provide a blue light beam;
an excitation light source, configured to provide an excitation light beam;
a first light splitting element, disposed on a transmission path of the excitation light beam; and
a wavelength conversion element, disposed on a transmission path of a blue light beam and the transmission path of the excitation light beam, and the wavelength conversion element comprising a columnar diffusion member and a wavelength conversion member, wherein the columnar diffusion member and the wavelength conversion member are respectively located on opposite sides of the wavelength conversion element;
at least one light valve, disposed on a transmission path of the illumination light beam, and configured to convert the illumination light beam into at least one image light beam; and
a projection lens module, disposed on a transmission path of the at least one image light beam, and configured to convert the at least one image light beam into the projection light beam, wherein the blue light beam passes through the columnar diffusion member, the excitation light beam passing through the first light splitting element is transmitted to the wavelength conversion member and converted into an excited light beam, and the excited light beam comprises a first red light beam and a green light beam.

10. The projection apparatus of claim 9, wherein the columnar diffusion member is a hollow columnar structure.

11. The projection apparatus of claim 9, wherein a wavelength of the blue light beam is greater than or equal to a wavelength of the excitation light beam.

12. The projection apparatus of claim 9, wherein the columnar diffusion member and the wavelength conversion member are distributed in a concentric circle manner on the wavelength conversion element.

13. The projection apparatus of claim 9, wherein a partition of the wavelength conversion member is a single continuous area.

14. The projection apparatus of claim 9, wherein the blue light source and the excitation light source are respectively located at opposite sides of the wavelength conversion element.

15. The projection apparatus of claim 9, further comprising:
a red light source, configured to provide a second red light beam; and
a second splitting element, disposed on the transmission path of the blue light beam and a transmission path of the second red light beam, wherein the second red light beam passes through the columnar diffusion member.

16. The projection apparatus of claim 9, wherein
the number of the at least one light valve is one, and the projection apparatus further comprises a light filter element, and
the light filter element is disposed on the transmission paths of the blue light beam and the excited light beam, and the light filter element comprises a first light filter region, a second light filter region and a transparent region, wherein the excited light beam passing through the first light filter region is converted into the first red light beam, and the excited light beam passing through the second light filter region is converted into the first red light beam.

17. The projection apparatus of claim 9, wherein the at least one light valve comprises a first light valve and a second light valve, the projection apparatus further comprises a light filter, and the light filter is disposed on a transmission path of the excited light beam, and configured to allow one of the first red light beam and the green light beam to pass through, transmit the one to the first light valve, reflect the other one and transmit the other one to the second light valve.

18. The projection apparatus of claim 9, wherein the at least one light valve comprises a first light valve, a second light valve and a third light valve respectively receiving the first red light beam, the green light beam and the blue light beam.

19. The projection apparatus of claim 9, further comprising:

a light uniformizing element, disposed on the transmission paths of the blue light beam and the excited light beam.

20. The illumination system of claim 9, wherein the first light splitting element disposes on the transmission path of the blue light beam.

* * * * *